United States Patent Office 2,887,505
Patented May 19, 1959

2,887,505

METHOD FOR THE MANUFACTURE OF O-ARYL O,O-DI-(LOWER-ALKYL) PHOSPHOROTHIOATES

Etcyl H. Blair, Midland, Mich., assignor to The Dow Chemical Company, Midland, Mich., a corporation of Delaware No Drawing. Application April 30, 1956
Serial No. 581,267

7 Claims. (Cl. 260—461)

The present invention is concerned with an improved method for the manufacture of O-aryl O,O-di-(lower-alkyl) phosphorothioates of the formula

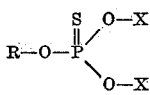

In this and succeeding formulae each X represents a lower-alkyl radical and R represents an aryl radical. The term "aryl" as herein employed refers to aromatic hydrocarbon radicals whether unsubstituted or substituted with one or more substituents including chlorine, bromine, alkyl, alkoxy, nitro, cyclohexyl, benzyl and phenyl. The term "lower-alkyl" refers to the alkyl radicals containing from one to three carbon atoms, inclusive. These compounds are useful as preservatives for paper, paint and wood and as parasiticides for the control of bacteria, fungi, mites and insect organisms such as aphids, Southern army worms and flies.

Several methods of preparing the O-aryl O,O-di-(lower-alkyl) phosphorothioates are known. In one method the compounds may be prepared by reacting an O-aryl phosphorodichloridothioate with a lower-alkanol in the presence of a hydrogen chloride acceptor such as pyridine. In another known method, the compounds are prepared from the reaction of an O-aryl phosphorodichloridothioate of an alkali metal alcoholate. The contacting of the reactants in such methods is carried out at a temperature of from about 15° to 80° C. Following the reaction, the reaction mixture may be filtered to separate alkali metal chloride, or pyridine hydrochloride and obtain the O-aryl O,O-di-(lower-alkyl) phosphorothioates as the filtrate. When operating in accordance with such methods, the O-aryl O,O-di-(lower-alkyl) phosphorothioates are obtained in unsatisfactory yields and purity.

It is an object of the present invention to provide a new and improved method for the production of O-aryl O,O-di-(lower-alkyl) phosphorothioates. It is a further object to provide a method which gives O-aryl O,O-di-(lower-alkyl) phosphorothioates of a better purity and in a greater yield than has been obtainable in known methods. Other objects will become apparent from the following specification and claims.

The new process comprises reacting as sole reagents a lower alkanol and a phosphorochloridothioate selected from the group consisting of the O-aryl phosphorochloridothioates and O-aryl O-lower alkyl phosphorochloridothioates at a temperature at which hydrogen chloride is formed as a product of reaction and until the formation of hydrogen chloride is substantially complete. Good results are obtained when the lower alkanol is reacted with the phosphorochloridothioate reagent in the proportion of one gram mole of the alkanol with not to exceed an amount of the phosphorochloridothioate reagent containing one-fourth gram atom of phosphorus-bound chlorine. When the formation of hydrogen chloride of reaction is substantially complete, the reaction mixture may be partially distilled under reduced pressure to separate low boiling constituents and to obtain as a residue the desired O-aryl O,O-di-(lower-alkyl) phosphorothioate. These products are obtained as crystalline solids or viscous liquids which are somewhat soluble in many organic solvents and of very low solubility in water. This new method gives the O-aryl O,O-di-(lower-alkyl) phosphorothioates in a yield and purity not previously obtainable by known methods.

Although the details of the reaction mechanisms are not completely understood, the reaction when carried out under the described conditions results in the substitution of the chlorine atoms of the O-aryl phosphorochloridothioate with alkoxy groups and the formation of hydrogen chloride of reaction. The reaction might be represented as taking place in accordance with the following equations:

(a) 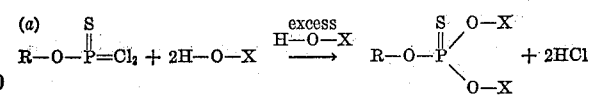

(b) 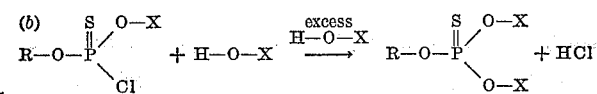

In the preparation of the O-aryl O,O-dialkyl phosphorothioates, it is critical that the alkanol is reacted with the phosphorochloridothioate reagent in the proportion of four gram moles of the alkanol with not to exceed an amount of the phosphorochloridothioate reagent containing one gram atom of phosphorus-bound chlorine. When employing such proportions, it is essential that any amount of the phosphorochloridothioate reagent containing in excess of 0.8 gram atom of phosphorus-bound chlorine be added gradually portionwise to the lower alkanol while continuously withdrawing hydrogen chloride in the gaseous state from the reaction mixture as formed. Thus the portionwise addition is carried out under reduced pressure or while passing an inert gaseous entraining agent through the reaction mixture. Such conditions effect the continuous withdrawal of hydrogen chloride from the reaction system as formed. Suitable gaseous entraining agents include nitrogen, methyl chloride, carbon dioxide or air. In the preferred method of operation, the alkanol is reacted with the phosphorochloridothioate reagent in the proportion of at least five gram moles of alkanol with an amount of phosphorochloridothioate reagent containing one gram atom of phosphorus-bound chlorine.

It is critical that the reaction of the present invention is carried out at temperatures not to exceed 65° C. and preferably at temperatures of from 15° to 45° C. The reaction takes place smoothly under these temperature conditions with the formation of the desired product and hydrogen chloride of reaction. Temperatures in excess of 65° C. should not be employed as they materially reduce the yields and purity of the desired products. The reaction is somewhat exothermic and the temperature may be controlled by regulation of the rate of contacting the reactant, and/or by contacting the reagents in an inert solvent and by external cooling. Suitable solvents include the hydrocarbon and halohydrocarbon solvents such as methylene chloride, ethylene dichloride, ethylene dibromide, carbon tetrachloride, chloroform, benzene and toluene.

The rate at which the reaction takes place has been found to vary directly with the temperature employed and also to vary with the particular reactants employed. For example, the rate of reaction decreases with increasing chain length of the employed alkanol. On the other hand, the O-aryl phosphorodichloridothioate and O-aryl O-lower alkyl phosphorochloridothioate reagents having halogen or nitro substituents on the O-aryl structure react with the lower alkanols more rapidly than the other phosphorochloridothioate reagents. The reaction is usually carried out over a period of from one to three hours, the reaction being substantially complete in such a period.

In carrying out the reaction of the present invention, the required amounts of the reagents are mixed together and maintained under the aforedescribed conditions. When the formation of hydrogen chloride of reaction is substantially complete, the reaction mixture may be distilled under reduced pressure at temperatures gradually increasing up to a temperature of 65° C. to separate low boiling constituents such as excess alkanol and solvent, if employed, and obtain the desired O-aryl O,O-di-(lower-alkyl) phosphorothioate as a liquid or crystalline residue. In an alternative method, the reaction mixture is added to water and the desired product separated therefrom as a liquid or solid material. The term "lower alkanol" as herein employed refers to the aliphatic alcohols containing from one to three carbon atoms, inclusive.

The following examples illustrate the invention but are not to be construed as limiting.

EXAMPLE 1

*O-(2,4,5-trichlorophenyl)O,O-dimethyl phosphorothioate*

O-(2,4,5 - trichlorophenyl) phosphorodichloridothioate (165.2 grams; 0.5 mole) was added portionwise with stirring to 3200 grams (100 moles) of methanol over a period of ten minutes. The addition was carried out at the boiling temperature of methanol (65° C.) and the reaction thereafter maintained at this same temperature with stirring for one-half hour. The reaction mixture was then partially distilled under reduced pressure to recover part of the methanol. The remaining methanol was removed by evaporation to obtain an O-(2,4,5 - trichlorophenyl) O,O-dimethyl phosphorothioate product as a white crystalline residue. This product was washed with a petroleum ether (boiling at 30°–60° C.) and dried. The dried product was otbained in a yield of 96.5 percent. O-(2,4,5-trichlorophenyl) O,O-dimethyl phosphorothioate melts at 39°–41° C.

EXAMPLE 2

O-(2,4,5 - trichlorophenyl) phosphorodichloridothioate (66 grams, 0.2 mole) was added portionwise with stirring to 160 grams (5 moles) of methanol over a period of 25 minutes. The addition was carried out with cooling and at a temperature of from 25° to 30° C. Stirring was thereafter continued and the reaction mixture maintained at a temperature of 28° to 32° C. for six hours. The reaction mixture was then partially distilled under reduced pressure at gradually increasing temperatures up to a temperature of 30° C. at 10 millimeters pressure to remove unreacted methanol. The residue was then poured into cold water whereupon an O-(2,4,5-trichlorophenyl) O,O-dimethyl phosphorothioate product precipitated as a crystalline solid. This product was separated by filtration and dried. The dried product was obtained in a yield of 95.6 percent and melted at 39°–40° C.

EXAMPLE 3

O-(2,4,5 - trichlorophenyl) phosphorodichloridothioate (0.2 mole) was added portionwise with stirring to 96 grams (3.0 moles) of methanol over a period of 18 minutes. The addition was carried out at a temperature of from 22° to 41° C., and the reaction mixture thereafter maintained at a temperature of 31° to 45° C. with stirring for a period of 2.75 hours. The excess methanol was then removed by partial distillation under reduced pressure, and the residue poured into cold water. An O - (2,4,5 - trichlorophenyl) O,O-dimethyl phosphorothioate product precipitated in the aqueous mixture and was separated and dried. The dried product was obtained in a yield of 93 percent.

EXAMPLE 4

O-(2,4,5 - trichlorophenyl) O-methyl phosphorochloridothioate (32.6 grams, 0.1 mole) was added to 640 grams (20 mole) of methanol and the resulting mixture heated at the boiling temperature (63°–65° C.) for 45 minutes. The excess methanol was then removed by evaporation to obtain an O-(2,4,5-trichlorophenyl) O,O-dimethyl phosphorothioate product in a yield of 89 percent.

EXAMPLE 5

*O-(4-methylphenyl) O,O-dimethyl prosphorothioate*

O-(4-methylphenyl) phosphorodichloridothioate (48.2 grams, (0.2 mole) boiling at 122°–128° C. at 6–8 millimeters pressure) was added with stirring to 1280 grams (40 moles) of methanol at the boiling temperature of methanol and the resulting mixture maintained with stirring at this temperature for 2.5 hours. The methanol was then removed by partial distillation under reduced pressure, the residue diluted with water and methylene dichloride, and the resulting mixture washed with water. The washed mixture was then partially distilled under reduced pressure at gradually increasing temperatures up to 60° C. at 15 millimeters pressure to remove the methylene dichloride solvent. As a result of these operations there was obtained an O-(4-methylphenyl) O,O-dimethyl phosphorothioate product as a viscous liquid in a yield of 86 percent. This product had a density of 1.278 at 25° C. and a refractive index ($n$/D) of 1.5258 at 25° C.

EXAMPLE 6

*O-(2-bromo-4-biphenylyl) O,O-dimethyl phosphorothioate*

O-(2 - bromo - 4 - biphenylyl) phosphorodichloridothioate (38.2 grams (0.1 mole), boiling at 175°–180° C. at 0.2 to 0.5 millimeter pressure) was added with stirring to 60 grams (5 moles) of methanol and the resulting mixture heated at the boiling temperature (64°–65° C.) for 20 minutes. Upon evaporation of the excess methanol an O-(2-bromo-4-biphenylyl) O,O-dimethyl phosphorothioate product was obtained in a yield of 91 percent. This product was a crystalline solid melting at 65°–66.5° C.

EXAMPLE 7

*O-(2,4-dichlorophenyl) O,O-diethyl phosphorothioate*

O - (2,4 - dichlorophenyl) phosphorodichloridothioate (15.5 grams (0.052 mole) boiling at 154° at 10 millimeters pressure) was added to 46 grams (1 mole) of ethanol and the resulting mixture heated with stirring for five hours at a temperature of from 32° to 48° C. The reaction mixture was then diluted with methylene dichloride, and the diluted mixture washed with water and thereafter partially distilled under reduced pressure to separate excess solvent. As a result of these operations there was obtained an O-(2,4-dichlorophenyl) O,O-diethyl phosphorothioate product as a viscous liquid in a yield of 87.5 percent.

EXAMPLE 8

One mole of O-(2,4,5-trichlorophenyl) phosphorodichloridothioate was added slowly portionwise with stirring to 10 moles of methanol over a period of four hours. The addition was carried out at temperatures gradually increasing from 19° to 38° C. and under pressure of 250 millimeters. Following the addition, stirring was continued for three hours at a temperature of from 38° to 40° C. and under a pressure of 245 millimeters. The reaction mixture was thereafter washed with water and the washed product concentrated by partial distillation under reduced pressure at temperatures gradually increasing up to a temperature of 65° C. at 30 millimeters pressure to obtain an O-(2,4,5-trichlorophenyl) O,O-dimethyl phosphorothioate product as a crystalline residue in a yield of 86.5 percent.

EXAMPLE 9

One mole of O-(2,4-dichlorophenyl) phosphorodichloridothioate was added gradually portionwise over a period of four hours with stirring to a mixture comprising 8 moles of ethanol and 3 moles of ethylene dichloride. The addition was carried out at a temperature of from 24 to 40° C. and under a pressure of 250 millimeters. Following the addition the reaction mixture was maintained for three hours at a temperature of from 35° to 40° C. at 250 millimeters pressure. The reaction mixture was thereafter washed with water and the washed product partially distilled under reduced pressure at temperatures gradually increasing up to a temperature of 65° C. at 30 millimeters pressure. As a result of these operations there was obtained an O-(2,4-dichlorophenyl) O,O-diethyl phosphorothioate product as a colorless liquid residue in a yield of 83 percent.

EXAMPLE 10

O-(3-chloro-4-nitrophenyl) O,O-dimethyl phosphorothioate

O-(3-chloro-4-nitrophenyl) phosphorodichloridothioate (38.5 grams (0.125 mole), refractive index $n/D$ of 1.6063 at 20° C.) was added gradually portionwise over a period of one hour to a mixture comprising 1.25 mole of methanol and 0.375 mole of ethylene dichloride. The addition was carried out under reflux and at a temperature of from 34° to 38° C. and at a pressure of 245 millimeters. Following the addition the reaction mixture was maintained with stirring for four hours at a temperature of from 38° to 41° C. at 240 millimeters pressure. The reaction mixture was thereafter washed with water and the solvent removed by evaporation to obtain an O-(3-chloro-4-nitrophenyl) O,O-dimethyl phosphorothioate product as a liquid residue. This product was obtained in a yield of 84.5 percent and was a light colored water-insoluble oil.

EXAMPLE 11

O-(2,4,5-trichlorophenyl) O-methyl O-normalpropyl phosphorothioate

One mole of O-(2,4,5-trichlorophenyl) O-methyl phosphorochloridothioate is added gradually portionwise over a period of one hour with stirring to 9.5 moles of normal propanol. The addition is carried out at a temperature of from 30° to 40° C. and while passing a current of air through the reaction mixture. Stirring is thereafter continued and the reaction mixture maintained under these same conditions for four hours to complete the reaction. The reaction mixture is then washed with water and the washed product concentrated by partial distillation under reduced pressure at temperatures gradually increasing up to a temperature of 65° C. at 30 millimeters pressure to obtain an O-(2,4,5-trichlorophenyl) O-methyl O-normalpropyl phosphorothioate product as a liquid residue in a yield of 85 percent. This product has a density of 1.4081 at 25° C. and a refractive index $n/D$ of 1.5525 at 25° C.

In a similar manner, the method of the present invention may be employed to obtain very desirable yields of other O-aryl O,O-dialkyl phosphorothioates as follows:

O-(4-benzylphenyl) O,O-diethyl phosphorothioate by reacting ethanol with O-(4-benzylphenyl) phosphorodichloridothioate.

O-(2-chloro-4-tertiarybutylphenyl) O,O-dimethyl phosphorothioate by reacting methanol with O-(2-chloro-4-tertiarybutylphenyl) phosphorodichloridothioate.

O-phenyl, O,O-di-n-propyl phosphorothioate by reacting n-propanol with O-phenyl phosphorodichloridothioate.

O-(4-cyclohexylphenyl) O-methyl O-ethyl phosphorothioate by reacting ethanol with O-(4-cyclohexylphenyl) O-methyl phosphorochloridothioate.

O-(4-nitrophenyl) O,O-diethyl phosphorothioate by reacting ethanol with O-(4-nitrophenyl) phosphorodichloridothioate.

O-(4-bromophenyl) O-methyl O-n-propyl phosphorothioate by reacting n-propanol with O-(4-bromophenyl) O-methyl phosphorochloridothioate.

O-(2,4-dichlorophenyl) O,O-dimethyl phosphorothioate by reacting methanol with O-(2,4-dichlorophenyl) phosphorodichloridothioate.

O-(4-methoxyphenyl) O,O-dimethyl phosphorothioate by reacting methanol with O-(4-methoxyphenyl) phosphorodichloridothioate.

O-(4-nitro-2-chlorophenyl) O,O-dimethyl phosphorothioate by reacting methanol with O-(4-nitro-2-chlorophenyl) phosphorodichloridothioate.

The O-aryl phosphorodichloridothioates employed as starting materials as previously described may be prepared by reacting an excess of thiophosphoryl chloride with an alkali metal salt of phenol or a suitably substituted phenol. Good results are obtained when employing from two to four moles of thiophosphoryl chloride with each mole of the alkali metal salt. In carrying out the reaction, the phenolate, preferably as the sodium salt, is added portionwise with stirring to the thiophosphoryl chloride and the resulting mixture subsequently warmed for a short time to complete the reaction. The crude reaction mixture is then filtered and the filtrate fractionally distilled under reduced pressure to separate the desired starting material.

The O-aryl O-alkyl phosphorochloridothiotes employed as starting materials in the present method may be prepared by reacting from 2 to 3 molecular proportions of a lower alkanol with one molecular proportion of an O-aryl phosphorodichloridothioate at a temperature at which hydrogen chloride is formed as a product of reaction while continuously withdrawing hydrogen chloride in the gaseous state from the reaction mixture as formed, said temperature being at least 15 centigrade degrees below the boiling point at 760 millimeters pressure of the employed alkanol. In carrying out the reaction, the alkanol may be added portionwise to the O-aryl phosphorodichloridothioate reagent at a temperature of 40° to 50° C. and under conditions of reduced pressure in the reaction mixture. Following the reaction, the reaction mixture is partially distilled under reduced pressure to remove low boiling constituents and obtain the desired product as a crystalline or liquid residue. This method is disclosed and claimed in application Serial No. 581,284, filed concurrently herewith, by Henry Tolkmith, Etcyl H. Blair and Kenneth C. Kauer.

I claim:

1. A method for preparing O-aryl O,O-di-(lower alkyl) phosphorothioates which comprises reacting as sole reactants a lower alkanol and a phosphorochloridothioate selected from the group consisting of the O-aryl phosphorodichloridothioates and O-aryl O-lower alkyl phosphorochloridothioates at a temperature at which hydrogen chloride is formed as a product of reaction and until the formation of hydrogen chloride is substantially complete, said temperature not to exceed 65° C., the alkanol being reacted with the phosphorochloridothioate reagent in the proportion of four gram moles of the alkanol with not to exceed an amount of the phosphorochloridothioate reagent containing one gram atom of phosphorus-bound chlorine and the O-aryl in said O-aryl O,O-di(loweralkyl) phosphorothioate and phosphorochloridothioate being an O-aryl radical of the benzene series.

2. A method according to claim 1 wherein the alkanol is reacted with the phosphorochloridothioate reagent in the proportion of at least five gram moles of alkanol with an amount of phosphorochloridothioate reagent containing one gram atom of phosphorus-bound chlorine.

3. A method claimed in claim 1 wherein the phosphorochloridothioate reagent is an O-(2,4,5-trichlorophenyl) phosphorochloridothioate.

4. A method claimed in claim 1 wherein the phosphorochloridothioate reagent is O-(2,4-dichlorophenyl) phosphorodichloridothioate.

5. A method claimed in claim 1 wherein the phosphorochloridothioate reagent is O-(4-nitro-3-chlorophenyl) phosphorodichloridothioate.

6. A method claimed in claim 1 wherein the phosphorochloridothioate reagent is O-(4-nitro-2-chlorophenyl) phosphorodichloridothioate.

7. A method claimed in claim 1 wherein the phosphorochloridothioate reagent is O-(2-chloro-4-tertiarybutyl) phosphorodichloridothioate.

References Cited in the file of this patent

UNITED STATES PATENTS

| | | |
|---|---|---|
| 1,869,768 | Nicolai et al. | Aug. 2, 1932 |
| 2,506,344 | Cleary | May 2, 1950 |

FOREIGN PATENTS

| | | |
|---|---|---|
| 713,757 | Great Britain | Aug. 18, 1954 |

OTHER REFERENCES

"The Van Nostrand Chemist's Dictionary," D. Van Nostrand Co., Inc., New York, second printing (October 1953).

"The Condensed Chemical Dictionary," Reinhold Publishing Corp., New York, fifth edition (1956).